(12) United States Patent
Campillo et al.

(10) Patent No.: US 9,481,475 B2
(45) Date of Patent: Nov. 1, 2016

(54) MOBILE UNMANNED AERIAL VEHICLE INFRASTRUCTURE AND MANAGEMENT SYSTEM AND METHOD

(71) Applicant: The Boeing Company, Chicago, IL (US)

(72) Inventors: David Esteban Campillo, Madrid (ES); Enrique Juan Casado Magaña, Madrid (ES); David Scarlatti, Madrid (ES); Ivan Maza Alcañiz, Cádiz (ES); Fernando Caballero Benitez, Seville (ES); Ricardo Ragel de la Torre, Seville (ES)

(73) Assignee: The Boeing Company, Chicago, IL (US)

( * ) Notice: Subject to any disclaimer, the term of this patent is extended or adjusted under 35 U.S.C. 154(b) by 4 days.

(21) Appl. No.: 14/696,588

(22) Filed: Apr. 27, 2015

(65) Prior Publication Data

US 2016/0207637 A1    Jul. 21, 2016

(30) Foreign Application Priority Data

Jul. 1, 2014  (EP) .................................... 14382252

(51) Int. Cl.
| | |
|---|---|
| *B64F 1/00* | (2006.01) |
| *B64F 1/10* | (2006.01) |
| *G05D 1/00* | (2006.01) |
| *B64C 39/02* | (2006.01) |
| *G05D 1/10* | (2006.01) |

(52) U.S. Cl.
CPC ............. *B64F 1/007* (2013.01); *B64C 39/024* (2013.01); *B64F 1/10* (2013.01); *G05D 1/0011* (2013.01); *G05D 1/104* (2013.01); *B64C 2201/208* (2013.01)

(58) Field of Classification Search
CPC ....... B64F 1/007; B64F 1/10; G05D 1/0011; G05D 1/104; B64C 39/024; B64C 2201/208
USPC .................................................. 701/2–18, 23
See application file for complete search history.

(56) References Cited

U.S. PATENT DOCUMENTS

| | | | | |
|---|---|---|---|---|
| 4,818,990 | A * | 4/1989 | Fernandes ............... | G01R 15/14 340/12.32 |
| 5,716,032 | A * | 2/1998 | McIngvale ............ | B64C 39/024 244/185 |
| 6,874,729 | B1 * | 4/2005 | McDonnell ............. | B64C 25/68 244/63 |

(Continued)

FOREIGN PATENT DOCUMENTS

| | | |
|---|---|---|
| EP | 2 336 801 A2 | 6/2011 |
| EP | 2 515 147 A2 | 10/2012 |

OTHER PUBLICATIONS

Extended European Search Report, EP 14 38 2252 (2015).

*Primary Examiner* — Tyler J Lee
(74) *Attorney, Agent, or Firm* — Walters & Wasylyna LLC

(57) ABSTRACT

A mobile UAV infrastructure and management system for control and management of one or more unmanned aerial vehicles including at least one landing platform to facilitate operational readiness of the unmanned aerial vehicle, radio beacons for localization of the unmanned aerial vehicle, a command and control station in communication with the unmanned aerial vehicle, and an unmanned ground vehicle for deploying the landing platform, the radio beacons and the command and control station.

20 Claims, 5 Drawing Sheets

(56) References Cited

U.S. PATENT DOCUMENTS

| | | | |
|---|---|---|---|
| 8,439,301 B1 * | 5/2013 | Lussier | B64F 1/02 244/63 |
| 9,056,676 B1 * | 6/2015 | Wang | B64F 1/00 |
| 9,163,909 B2 * | 10/2015 | Chengalva | F41H 7/005 |
| 9,302,783 B2 * | 4/2016 | Wang | B64F 1/00 |
| 2003/0164794 A1 * | 9/2003 | Haynes | H04B 1/7172 342/353 |
| 2009/0314883 A1 * | 12/2009 | Arlton | B64C 39/024 244/63 |
| 2016/0124433 A1 * | 5/2016 | Cavender-Bares | A01C 7/00 701/2 |

* cited by examiner

MOBILE UNMANNED AERIAL VEHICLE INFRASTRUCTURE AND MANAGEMENT SYSTEM AND METHOD

PRIORITY

This application claims priority from European Patent Application Number EP14382252.6 filed on Jul. 1, 2014, the entire contents of which are incorporated herein by reference.

FIELD

The present disclosure generally relates to deployment and operation of a mobile unmanned aerial vehicle (UAV) infrastructure and, more specifically, to methods for deploying a mobile UAV infrastructure and management system to one or more areas to facilitate operation of one or more unmanned aerial vehicles (UAVs).

BACKGROUND

Continuous operations with autonomous unmanned aerial vehicles is an ongoing problem to be solved. Currently, missions are being operated with single expensive unmanned aerial vehicles in large areas launched from a fully dedicated "permanent" command and control station, with the unmanned aerial vehicles having to fly back to the launch site to refuel, reenergize or repair before continuing with the current mission. The immobility of the unmanned aerial vehicle support infrastructure (launch site) drastically reduces the operation efficiency of the unmanned aerial vehicle and, therefore, of the missions carried out by the unmanned aerial vehicle, as unmanned aerial vehicles are unable to provide detailed, close and continuous information from a particular area.

As such, current unmanned aerial vehicle operations rely on stationary deployment and acquisition platforms that do not provide for long-term mission support and operational life as the unmanned aerial vehicles are limited by the need to return to the launch site to refuel, recharge or repair equipment.

SUMMARY

The subject matter disclosed herein provides a unique and flexible solution to the deployment of a mobile or portable infrastructure and management system to support unmanned vehicle operations in multiple areas that may be considered remote or hostile.

In one embodiment, disclosed is a method for deploying a mobile UAV infrastructure and management system for control and management of one or more unmanned aerial vehicles. The method includes: (1) defining a first area for deployment of the mobile UAV infrastructure and management system; (2) deploying in the first area, by means of unmanned ground vehicles, the mobile UAV infrastructure and management system including: (a) a landing platform to facilitate operational readiness of the unmanned aerial vehicle; (b) a plurality of radio beacons for localization of the unmanned aerial vehicle with the mobile UAV infrastructure and management system; and (c) a command and control station for communication between the mobile UAV infrastructure and management system and the unmanned aerial vehicle; (3) if needed, defining a second area for deployment of the mobile UAV infrastructure and management system; and (4) deploying in the second area, by means of unmanned ground vehicles, the mobile UAV infrastructure and management system.

In another embodiment, disclosed is a mobile UAV infrastructure and management system for control and management of one or more unmanned aerial vehicles. The mobile UAV infrastructure and management system includes a landing platform to facilitate operational readiness of the unmanned aerial vehicle; a plurality of radio beacons for localization of the unmanned aerial vehicle with the mobile UAV infrastructure and management system; a command and control station for communication between the mobile UAV infrastructure and management system and the unmanned aerial vehicle; and an unmanned ground vehicle for deployment of the mobile UAV infrastructure and management system to a first area and, if needed, for deployment of the mobile UAV infrastructure and management system to a second area.

These and other embodiments will become readily apparent to those skilled in the art from the following detailed description, the accompanying drawings, and the appended claims.

DETAILED DESCRIPTION

Figure 1:
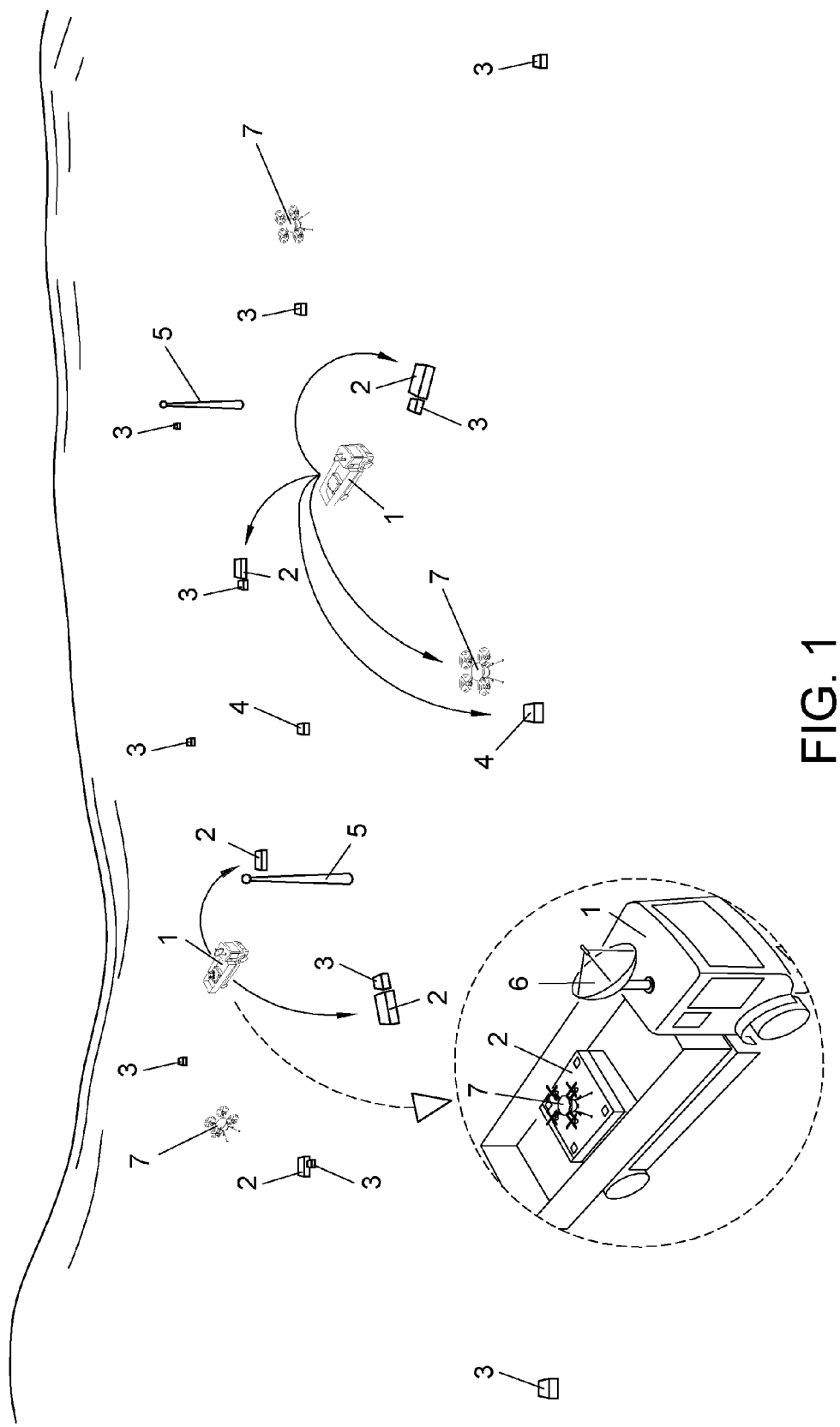
FIG. 1 shows a schematic view of a deployment of a mobile UAV infrastructure and management system carried out by multiple unmanned ground vehicles.

The mobile UAV infrastructure and management system described herein provides a solution for operating one or more unmanned aerial vehicles for extended operation times by providing an infrastructure and management system to support acquisition and recharging of the unmanned aerial vehicles.

The mobile UAV infrastructure and management system solves the limitations in current unmanned aerial vehicle missions in terms of the available payload and operation time of the unmanned aerial vehicles operating in remote or hostile areas where no appropriate infrastructure exists. The mobile UAV infrastructure and management system disclosed herein promotes unmanned aerial vehicle swarming, the use of multiple unmanned aerial vehicles, and a mixed fleet of unmanned aerial vehicles in an efficient manner by allocation of a moveable or mobile landing platform and associated communication and localization elements for managing arrival and departure of one or more unmanned aerial vehicles based on the current traffic and availability of landing platforms.

Exemplary embodiments will now be described with references to the accompanying figures, with like reference numerals referring to like elements throughout. The terminology used in the description is not intended to be interpreted in any limited or restrictive manner, simply because it is being utilized in conjunction with a detailed description of certain embodiments. Furthermore, various embodiments (whether or not specifically described herein) may include novel features, no single one of which is solely responsible for its desirable attributes or which is essential to practicing the subject matter described herein.

As shown in FIG. 1, in one embodiment, the disclosed unmanned aerial vehicle infrastructure and management system may include a landing platform 2, communication and localization elements, such as radio beacons 3, one or more command and control stations 4, antennae 5, 6, one or more unmanned aerial vehicles 7, and one or more unmanned ground vehicles 1.

The transport and deployment of the mobile UAV infrastructure and management system to one or more areas may be carried out by the unmanned ground vehicles 1. In this regard, the unmanned aerial vehicles 7 may be deployed with other elements of the mobile UAV infrastructure and management system by the unmanned ground vehicles 1, or the unmanned aerial vehicles 7 may be remotely and/or autonomously deployed to the one or more areas independent of the unmanned ground vehicles 1 where the unmanned aerial vehicles 7 carry out their mission objectives.

Due to the mobility of unmanned ground vehicles 1, transport and deployment of the mobile UAV infrastructure and management system, including the landing platforms 2, to one or more areas may be accomplished in a relatively fast and efficient manner. Although the methods disclosed herein are described in the context of mobile operations for unmanned aerial vehicles, deployment of similar articles or apparatus, such as ground vehicles, are within the scope of the present disclosure.

The unmanned ground vehicles 1 may be provided with various apparatus for loading and unloading the different elements that form the mobile UAV infrastructure and management system, such as, the landing platform 2, the radio beacons 3, the command and control station 4, antennae 5 and, optionally, the unmanned aerial vehicles 7. In this regard, the mobile UAV infrastructure and management system may include cranes, magnets and the like for loading and unloading the various elements. The unmanned ground vehicles 1 may further include a ramp in order to facilitate loading and unloading the various elements of the mobile UAV infrastructure and management system.

The unmanned ground vehicles 1 may also include proximity sensors, positioning measurement systems, cameras, etc., for assisting in loading and unloading the various elements of the mobile UAV infrastructure and management system. Proximity sensors, cameras and positioning measurement systems may provide a visual picture for increased situational awareness during the attachment or uploading of the landing platform 2 from one location onto the unmanned ground vehicle 1 (e.g., onto the trailer or body of the unmanned ground vehicle 1). The mobile UAV infrastructure and management system may then be deployed to a different location, where during the unloading operation of the various elements, the proximity sensors, cameras and positioning measurement systems may facilitate the positioning of the landing platform 2 on the ground assuring the safe and efficient deployment of the landing platform 2 and other elements of the mobile UAV infrastructure and management system.

The unmanned ground vehicles 1 may further include various apparatus for automatically securing the mobile UAV infrastructure and management system and associated elements during the transport operation, such as, for example, magnets on the unmanned ground vehicle 1 (e.g., on the trailer or body of the unmanned ground vehicle 1). All the operations of the unmanned ground vehicles 1 may be preprogrammed into the unmanned ground vehicles 1 for complete autonomous operation or teleoperated by a user from a remote control station.

The position and number of the different elements (landing platforms 2, radio beacons 3 and command and control stations 4) deployed are selected for achieving optimal localization and ground based communication with the unmanned aerial vehicles 7 and the mobile UAV infrastructure and management system. Such determined efficiency of the mobile UAV infrastructure and management system will depend at least on the terrain encountered in the area.

In one embodiment, a minimum of four radio beacons 3 will be deployed in the area, as four is generally accepted as the minimum number of signals required for an accurate estimation of the position of the unmanned aerial vehicles 7. Those skilled in the art will understand that fewer or more radio beacons 3 may be utilized or a similar technology may be employed depending on various factors including among other things, operational parameters, terrain, etc.

The command and control stations 4 may provide command and control communications between the unmanned aerial vehicles 7 and the command and control station 4 by way of data transmissions for operational command and control of the unmanned aerial vehicles 7. The command and control stations 4 may facilitate command, control and management of the unmanned aerial vehicles 7 deployed by the unmanned ground vehicles 1 of the mobile UAV infrastructure and management system to ensure unmanned aerial vehicle operational readiness and mission success. The command and control stations 4 may be placed on the ground in the selected area, attached to the landing platforms 2 and/or on the unmanned ground vehicles 1, etc.

In one embodiment, the mobile UAV infrastructure and management system may include the deployment of a remote communication system, such a satellite communication system, with a remote control center from which data from the deployment and operation of the mobile UAV infrastructure and management system is provided to facilitate operational control and supervision of the deployment operation. The remote communication system may be placed on the ground or on the unmanned ground vehicles 1 (e.g., a parabolic antenna 6 attached to the roof of the unmanned ground vehicle 1).

The landing platforms 2 may be deployed to facilitate operational readiness of the one or more unmanned aerial vehicles 7. The landing platforms 2 may be deployed to maintain a distance relative to each other that provides a safety radius during operation of the unmanned aerial vehicles 7. The safety radius may be determined by a minimum distance needed for the unmanned aerial vehicles 7 to take-off and land.

The deployment of the radio beacons 3 may be configured to permit or allow a trilateration of the unmanned aerial vehicles 7 in an airport control area (see control area 8 in FIG. 2) of the mobile UAV infrastructure and management system, the airport control area being defined by a radio range of the radio beacons 3. More specifically a trilateration may be achieved when the centroid of the positions of the landing platforms 2 has a horizontal dilution of precision (HDOP) value of about 1.

Deployment of the radio beacons 3 may include calculating a centroid of the positions of the deployed landing platforms 2, the centroid having a horizontal dilution of precision (HDOP) value of about 1; calculating a radius of a circle centered in the centroid according to the radio range of the radio beacons 3, a required localization accuracy in vicinity of the landing platforms 2, a size of a control area around the mobile UAV infrastructure and management system where the localization service of the unmanned aerial vehicles 7 is provided, the control area being defined by the radio range of the radio beacons 3; and, placing the radio beacons 3 equally spaced in the calculated circle.

A method for managing the mobile UAV infrastructure and management system previously described is also disclosed. The method may include deploying at least one unmanned aerial vehicle 7, determining the position of the unmanned aerial vehicle 7 depending on the distance of the unmanned aerial vehicle 7 to the landing platforms 2, assigning a landing platform 2 for the unmanned aerial vehicle 7 by means of the command and control station 4, and landing the unmanned aerial vehicle 7 in the assigned landing platform 2.

Figure 2:
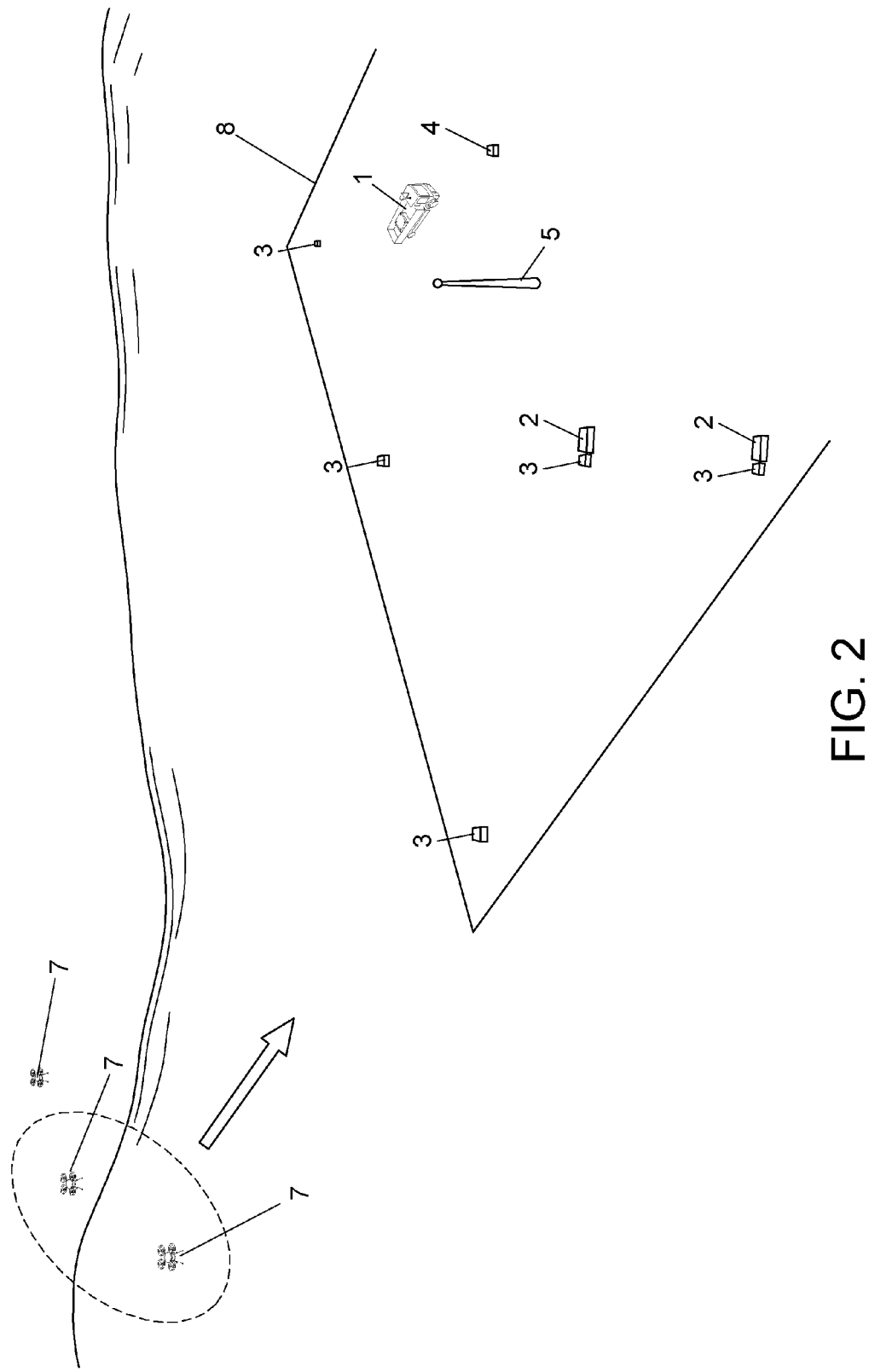
FIG. 2 shows a schematic view of one or more unmanned aerial vehicles returning to an area of the mobile UAV infrastructure and management system using an onboard GPS.

The method may calculate the position of the unmanned aerial vehicle 7 by means of a global positioning system (GPS) placed onboard the unmanned aerial vehicle 7 when the unmanned aerial vehicle 7 is out of the control area (see control area 8 in FIG. 2). As indicated above, the control area may be determined by a radio range of the airport area radio beacons. On the other hand, the position of the unmanned aerial vehicle 7 may be determined by means of a local positioning system comprising the radio beacons 3 when the unmanned aerial vehicle 7 is inside the control area.

In one method, the mobile UAV infrastructure and management system may switch from the global positioning system to the local positioning system based on the radio beacons 3 for calculating the position of the unmanned aerial vehicle 7 when the unmanned aerial vehicle 7 is inside of the airport control area (see control area 8 in FIG. 2) and an estimated position of the unmanned aerial vehicle 7 calculated by the global positioning system and an estimated position of the unmanned aerial vehicle 7 calculated by the radio beacons 3 is less than a predetermined value during more than a predetermined period of time. More specifically, the switching may be carried out when the Euclidean distance of the mentioned estimations is less than a predetermined value during a predetermined period of time. The computation of the estimated position of the unmanned aerial vehicle 7 calculated by the radio beacons 3 may run in parallel with the use of the GPS by the unmanned aerial vehicles 7.

The method may further switch from the local positioning system to a relative localization system based on visual markers and ultrasonic devices for calculating the position of the unmanned aerial vehicle 7 when the unmanned aerial vehicle 7 is in proximity to the landing platform 2 and an estimated position of the unmanned aerial vehicle 7 calculated by the local positioning system and an estimated position of the unmanned aerial vehicle 7 calculated by the relative localization systems is less than a predetermined value during more than a predetermined period of time. More specifically, the switching may be carried out when the Euclidean distance of the mentioned estimations is less than a predetermined value during a predetermined period of time. The computation of the estimated position of the unmanned aerial vehicle 7 calculated by the relative localization system may run parallel with the use of the GPS by the unmanned aerial vehicles 7.

In order to assign a landing platform 2 to an unmanned aerial vehicle 7, the command and control station 4 may consider the position of each unmanned aerial vehicle 7, current unmanned aerial vehicle traffic, and availability of each of the landing platforms 2.

Automated air traffic management procedures may be simplified due to the vertical take-off and landing (VTOL) capabilities of the unmanned aerial vehicles 7. Allocation of unmanned aerial vehicles 7 to landing platforms 2 may be done in a first step based on simple metrics, such as the distance between unmanned aerial vehicles 7 (the unmanned aerial vehicle 7 goes to the closest landing platform 2). On the other hand, trajectory conflicts may be solved by changing altitudes of the unmanned aerial vehicles 7 involved in the potential collision. Additionally, in some circumstances, both allocation/conflicts can be simultaneously solved with algorithms that can compute optimal solutions during the operation of the system.

As indicated above, the deployment of the landing platforms 2, radio beacons 3, command and control stations 4, antenna 5, 6, and the unmanned aerial vehicles 7 may be automatically carried out by means of unmanned ground vehicles 1. An important aspect of the mobile UAV infrastructure and management system is that the positions of the landing platforms 2 are capable of being changed during the execution of any mission. In this regard, the entire mobile UAV infrastructure and management system may be moved during the mission and the unmanned aerial vehicles 7 may adapt to the change via reception of a communication reporting the location of the new centroid of the landing platforms 2. These changes in the location of the entire portable airport infrastructure to address new threats or mission parameters are detected close to the initial location. The information related to the changes in the location of the airport is exchanged between the unmanned aerial vehicles 7 and the command and control stations 4 by means of conventional data links. These data links can be established by direct communication or by satellite communication between both parts.

In a method related to the mobile UAV infrastructure and management system, a first area is defined in which the mobile UAV infrastructure and management system is going to be deployed. In this regard, deployment of the mobile UAV infrastructure and management system may be in a relatively remote area. Such remote areas are generally places where, due to geographic, economic or political reasons, access to the area is difficult and construction of a permanent airport infrastructure is even more difficult.

In one embodiment, the unmanned aerial vehicles 7 are vertical take-off and landing unmanned aerial vehicles.

In another embodiment, the deployment of the mobile UAV infrastructure and management system is selected between a teleoperated deployment from a remote control station, an autonomous deployment and any combination thereof.

Once the remote area has been defined, the autonomous deployment of the components that form the mobile UAV infrastructure and management system is carried out. FIG. 1 shows a schematic view of a deployment stage carried out by multiple unmanned ground vehicles 1 (e.g., trucks or similar transport carriers). The unmanned ground vehicles 1 are capable of transport and deployment of landing platforms 2, radio beacons 3, command and control stations 4, antennae 5, 6, and one or more unmanned aerial vehicles 7 about a first designated area.

Each landing platform 2 for facilitating operational readiness of one or more unmanned aerial vehicles 7 is transported on the body of the unmanned ground vehicle 1, and is equipped with one or more radio beacons 3 for communicating its relative localization to one or more unmanned aerial vehicles 7. Other radio beacons 3 that are independent of the landing platform 2 and capable of communicating in a similar manner with unmanned aerial vehicles 7 are deployed strategically around the area in order to create a confinement or control area (see control area 8 in FIG. 2) so that the unmanned aerial vehicles 7 may be positioned using the plurality of radio beacons 3.

In one embodiment, the unmanned ground vehicles 1 may be remotely sent and controlled from a permanent or mobile control infrastructure. The management of the unmanned ground vehicles 1 may be carried out by remote control, such as, for example, with the assistance of satellite communications antennae 5 placed on the ground and/or parabolic antennae 6 placed on the roof of the unmanned ground vehicles 1. Alternatively, the unmanned ground vehicles 1 may be programmed to autonomously traverse to the designated area to deploy the mobile UAV infrastructure and management system.

Following deployment of the radio beacons 3, the landing platforms 2 and the command and control stations 4 in the first area, the unmanned ground vehicles 1 may deploy one or more (e.g., a plurality of) unmanned aerial vehicles 7. The unmanned aerial vehicles 7 may take-off directly from the unmanned ground vehicles 1 under remote control to begin a mission from the mobile UAV infrastructure and management system. Each unmanned aerial vehicle 7 may establishes a data link with the command and control stations 4 in order to exchange information, such as information relative to the location of the mobile UAV infrastructure and management system and the state of the unmanned aerial vehicle 7.

When an unmanned aerial vehicle 7 performing a mission detects that some kind of tune up is needed, as for example, when it detects a low battery level or when it needs to replace or repair a payload, the unmanned aerial vehicle 7 returns to the landing platform 2 positioned in the control area 8 (FIG. 2) of the mobile UAV infrastructure and management system using the onboard GPS. In this way, the mobile UAV infrastructure and management system, and more specifically the landing platform 2, ensures or facilitates the operational readiness of the one or more unmanned aerial vehicles 7.

As shown in FIG. 2, when the unmanned aerial vehicles 7 are beyond the communication range of a control area 8, which is determined by the radio range of the radio beacons 3, the unmanned aerial vehicles 7 may be guided by GPS. The GPS location of the mobile UAV infrastructure and management system is reported to the unmanned aerial vehicles 7 through the data link during the mission. Accordingly, the mobile UAV infrastructure and management system may be moved by the unmanned ground vehicles 1 from one location (or first area) to another location (or second area) without disruption of the communication of the unmanned aerial vehicles 7 and the command and control station 4 to facilitate a continuous uninterrupted mission.

Figure 3:
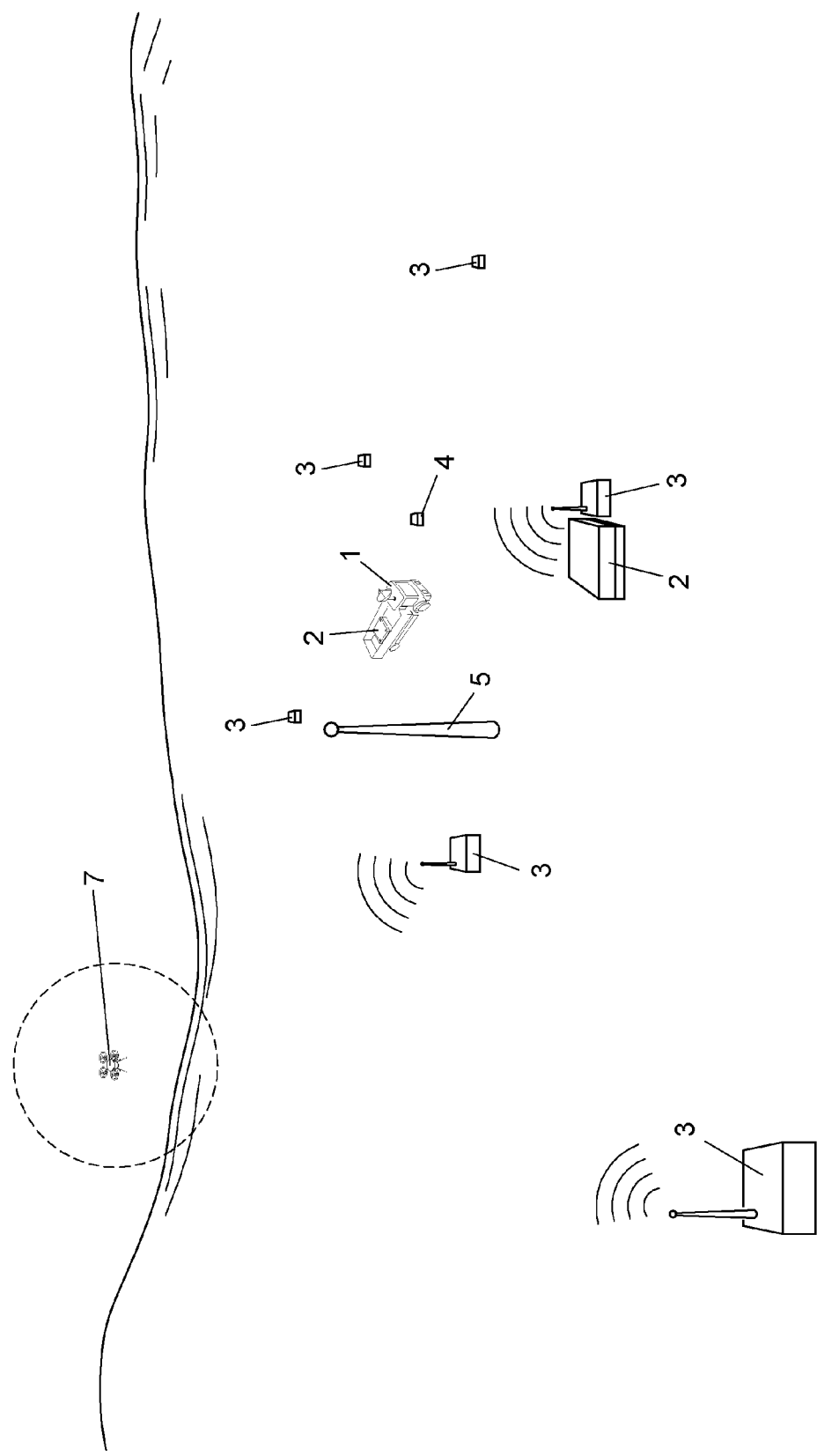
FIG. 3 shows a schematic view of an unmanned aerial vehicle changing localization mode from a GPS global localization system to a radio beacon local positioning system of the mobile UAV infrastructure and management system.

FIG. 3 illustrates the arrival of an unmanned aerial vehicle 7 to the mobile UAV infrastructure and management system, specifically the arrival of an unmanned aerial vehicle 7 in a control area 8 (FIG. 2) defined by the radio beacons 3, as determined by the range of the radio beacons 3. In this regard, the localization system of the unmanned aerial vehicle 7 changes from the GPS global localization system to a radio beacon local positioning system. Switching between the GPS-based global localization system and the radio beacon-based local positioning system may be carried out when the Euclidean distance between the estimated position of the unmanned aerial vehicle 7 calculated by the GPS onboard the unmanned aerial vehicle 7 and the estimated position of the unmanned aerial vehicle 7 calculated by the radio beacons 3 is less than a predetermined value during more than a given period of time.

The benefits of using a local positioning system based on the airport area radio beacons 3 are that the relative localization of the unmanned aerial vehicles 7 in the control area 8 of the mobile UAV infrastructure and management system has an increased accuracy for collision avoidance purposes, and as the position of the landing platforms 2 is dynamic and can change with time the unmanned aerial vehicle 7 receives the current position of the landing platforms 2 relative to the unmanned aerial vehicle 7.

Figure 4:
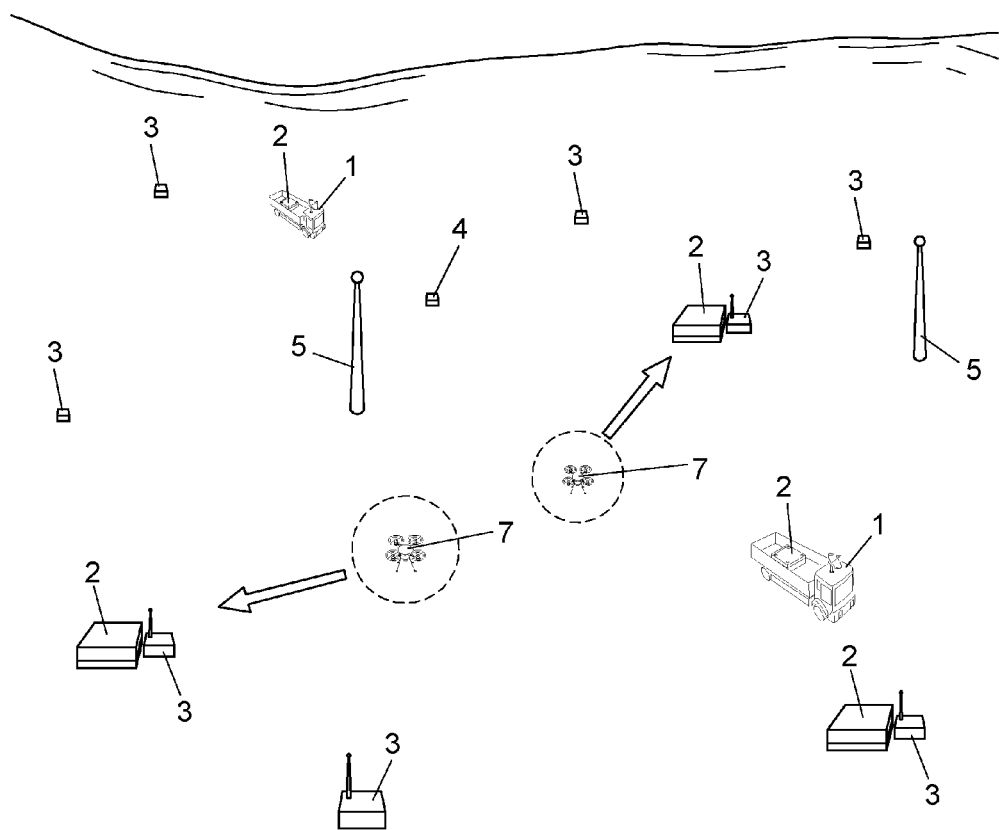
FIG. 4 shows a schematic view of the command and control station allocating a landing platform to one or more unmanned aerial vehicles based on current unmanned aerial vehicle traffic and availability of landing platforms.

As shown in FIG. 4, the unmanned aerial vehicle 7 may communicate with the command and control station 4 by way of the data link to facilitate landing at a landing platform 2 based on the current aerial traffic and availability of landing platforms 2. The unmanned aerial vehicle 7 then proceeds to the designated landing platform 2.

Figure 5:
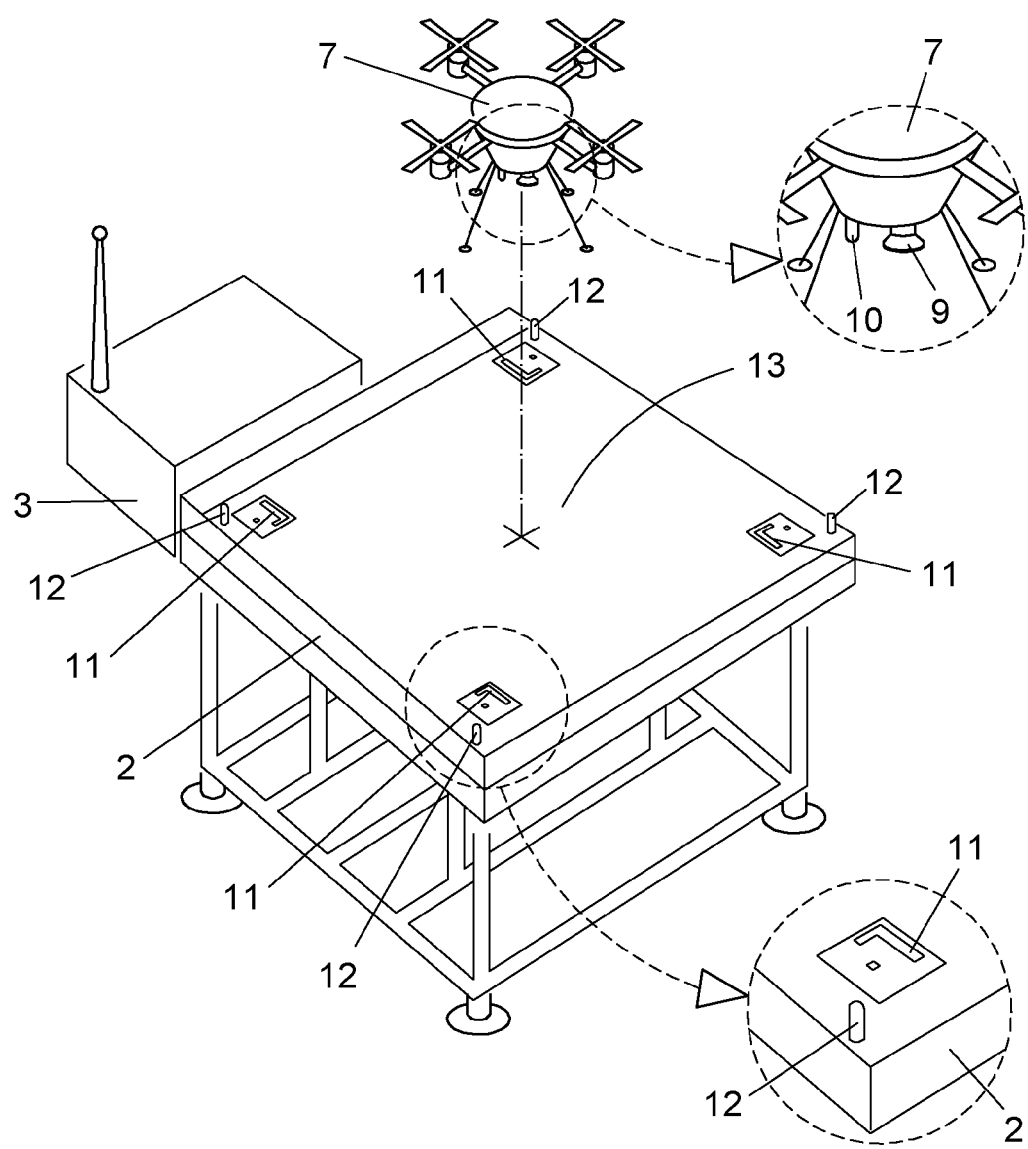
FIG. 5 shows a schematic view of an unmanned aerial vehicle changing localization mode from a radio beacon local positioning system to a relative localization system based on visual markers and/or ultrasonic devices upon arrival at the mobile UAV infrastructure and management system.

As the landing platforms 2 may be sized relatively small to allow easy transportation and deployment, the typical landing maneuver of the unmanned aerial vehicle 7 may require increased relative localization accuracy compared to that provided by the radio beacons 3. As such, once the unmanned aerial vehicle 7 is in the vicinity of the landing platform 2, localization may change from the radio beacon localization system to a localization system based on visual markers and ultrasonic devices. For example, as shown in FIG. 5, the unmanned aerial vehicle 7 may be provided with visual cameras 9 for detecting visual markers and ultrasonic sensors 10 for receiving ultrasonic signals, while the landing platform 2 is provided with fiducial or visual markers 11 and ultrasonic transmitters 12.

The visual cameras 9 may provide situational awareness for remote operators of the unmanned aerial vehicles 7 or unmanned aerial vehicle system components to assist in landing the unmanned aerial vehicles 7 at the landing platforms 2. The visual markers 11 and the ultrasonic transmitters 12 in the landing platform 2 may be placed at the corners of a landing area 13 of the landing platform 2 to delimit the dimensions thereof and its position with respect to the unmanned aerial vehicle 7. The localization mode switching between the radio beacons 3 and the relative localization system based on visual markers 11, camera 9, ultrasonic sensors 10, and ultrasonic transmitters 12 may be carried out when the Euclidean distance between the estimated position of the unmanned aerial vehicle 7 calculated by the radio beacons 3 and the estimated position of the unmanned aerial vehicle 7 calculated by the relative localization system is less than a predetermined value during more than a given period of time. The benefits of using a relative localization system based on visual markers 11 and/or ultrasonic devices (e.g., ultrasonic sensors 10 and ultrasonic transmitters 12) is that the positioning of the unmanned aerial vehicle 7 has an increased accuracy, which is crucial for avoiding damage to the unmanned aerial vehicle 7 when landing on the landing area 13 of the landing platform 2.

When the unmanned aerial vehicle 7 lands, the onboard battery used for aerial and communication power may be automatically changed or the payload may be automatically replaced. This operation is not shown in the figures, but in a particular embodiment, when the unmanned aerial vehicle 7 needs to automatically change its battery, a bar disposed on the landing platform 2 would move the unmanned aerial vehicle 7 towards a conveyor belt disposed on the landing platform 2, which in turn would move the unmanned aerial vehicle 7 towards a device for battery changing. Then, the battery of the unmanned aerial vehicle would be automatically replaced. Then, the unmanned aerial vehicle 7 would be ready to take-off again and continue performing its cooperative mission.

The description of the different embodiments and implementations has been presented for purposes of illustration and description, and is not intended to be exhaustive or limited to the implementations in the form disclosed. Many modifications and variations will be apparent to those of ordinary skill in the art. Further, different embodiments and implementations may provide different attributes as compared to other embodiments and implementations. The embodiments or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have stages that do not differ from the literal language of the claims, or if they include equivalent stages with insubstantial differences from the literal languages of the claims.

What is claimed is:

1. A mobile UAV infrastructure and management system for control and management of one or more unmanned aerial vehicles, said system comprising:
   a plurality of radio beacons defining a control area, wherein said plurality of radio beacons facilitate localization of said unmanned aerial vehicle when said unmanned aerial vehicle is within said control area;
   at least one landing platform positioned in said control area, said landing platform facilitating operational readiness of said unmanned aerial vehicle;
   a command and control station in communication with said unmanned aerial vehicle for operational control of said unmanned aerial vehicle; and
   an unmanned ground vehicle, which is either autonomous or teleoperated, for transport of said landing platform, said plurality of radio beacons and said command and control station to a designated area, and for deployment of said landing platform, said plurality of radio beacons and said command and control station about said designated area.

2. The mobile UAV infrastructure and management system of claim 1 comprising a plurality of landing platforms.

3. The mobile UAV infrastructure and management system of claim 2 wherein, when deployed, each landing platform of said plurality of landing platforms is spaced a distance from the other landing platforms of said plurality of landing platforms, and wherein said distance is based on a minimum distance required for said unmanned aerial vehicle to take-off and land.

4. The mobile UAV infrastructure and management system of claim 2 wherein, when deployed, said plurality of landing platforms define a centroid, and wherein said plurality of radio beacons are equally spaced in an area determined by a circle centered on said centroid and having a horizontal dilution of precision less than 1, with a radius determined by a radio range of said plurality of radio beacons.

5. The mobile UAV infrastructure and management system of claim 4 further comprising a remote communication system for communicating with a remote control center that controls and supervises said deployment of said landing platform, said plurality of radio beacons and said command and control station.

6. The mobile UAV infrastructure and management system of claim 4 wherein said unmanned aerial vehicle is a vertical take-off and landing unmanned aerial vehicle.

7. A method for deploying the mobile UAV infrastructure and management system of claim 1 comprising:
   defining a first area for said deployment of said landing platform, said plurality of radio beacons and said command and control station; and
   deploying from said unmanned ground vehicle in said first area said landing platform, said plurality of radio beacons and said command and control station.

8. The method of claim 7 further comprising loading onto said unmanned ground vehicle said deployed landing platform, said deployed plurality of radio beacons and said deployed command and control station.

9. The method of claim 8 further comprising:
   defining a second area for said deployment of said landing platform, said plurality of radio beacons and said command and control station; and
   deploying from said unmanned ground vehicle in said second area said landing platform, said plurality of radio beacons and said command and control station.

10. The method of claim 9 further comprising communicating to said unmanned aerial vehicle a location indicative of said second area.

11. The method of claim 7 wherein said mobile UAV infrastructure and management system of claim 1 comprises a plurality of landing platforms, and wherein said deploying step comprises maintaining a distance between each landing platform of said plurality of landing platforms that is higher than a safety radius, said safety radius being determined by a minimum distance needed for said unmanned aerial vehicle to take-off and land.

12. The method of claim 7 wherein said mobile UAV infrastructure and management system of claim 1 comprises a plurality of landing platforms, and wherein said deploying step comprises:
   calculating a centroid of the positions of said deployed plurality of landing platforms having a horizontal dilution of precision less than 1;
   calculating a radius of a circle centered on said centroid according to a radio range of said plurality of radio beacons, a required localization accuracy in vicinity of said plurality of landing platforms, and a size of said control area defined by said plurality of radio beacons; and
   placing said plurality of radio beacons equally spaced in said circle.

13. The method of claim 7 further comprising deploying a remote communication system for communicating with a remote control center that controls and supervises said deployment of said landing platform, said plurality of radio beacons and said command and control station.

14. The method of claim 13 wherein said remote communication system comprises an antenna.

15. The method of claim 7 wherein said deployment step is a teleoperated deployment or an autonomous deployment.

16. A method for managing the mobile UAV infrastructure and management system of claim 1, the mobile UAV infrastructure and management system comprising a plurality of landing platforms, said method comprising:
  deploying said unmanned aerial vehicle;
  determining a position of said unmanned aerial vehicle depending on a distance of said unmanned aerial vehicle from said plurality of landing platforms;
  assigning said unmanned aerial vehicle a landing platform of said plurality of landing platforms; and
  landing said unmanned aerial vehicle on said assigned landing platform.

17. The method of claim 16 wherein said position of said unmanned aerial vehicle is determined using a global positioning system onboard of said unmanned aerial vehicle when said unmanned aerial vehicle is outside of said control area defined by of said plurality of radio beacons.

18. The method of claim 17 wherein said position of said unmanned aerial vehicle is determined by switching from said global positioning system to a local positioning system based on said plurality radio beacons when said unmanned aerial vehicle is inside of said control area.

19. The method of claim 18 wherein said position of said unmanned aerial vehicle is determined by switching from said local positioning system to a relative localization system based on at least one of a visual marker and an ultrasonic device when said unmanned aerial vehicle is within a predefined proximity of said landing platform.

20. The method of claim 16 wherein said assigned landing platform is assigned based on at least one of current position of said unmanned aerial vehicle, current unmanned aerial vehicle traffic and availability of said plurality of landing platforms.

* * * * *